(12) United States Patent
Sammons (10) Patent No.: US 10,350,509 B2
(45) Date of Patent: Jul. 16, 2019

(54) ELECTRIC STILL WITH EXTERNAL HEATING ELEMENT

(71) Applicant: Brian Sammons, Milwaukee, WI (US)

(72) Inventor: Brian Sammons, Milwaukee, WI (US)

( * ) Notice: Subject to any disclaimer, the term of this patent is extended or adjusted under 35 U.S.C. 154(b) by 256 days.

(21) Appl. No.: 15/285,006

(22) Filed: Oct. 4, 2016

(65) Prior Publication Data
US 2017/0095749 A1    Apr. 6, 2017

Related U.S. Application Data

(60) Provisional application No. 62/284,560, filed on Oct. 5, 2015.

(51) Int. Cl.
| | |
|---|---|
| *B01D 3/02* | (2006.01) |
| *B01D 3/00* | (2006.01) |
| *H05B 1/02* | (2006.01) |
| *B01D 3/42* | (2006.01) |
| *H05B 3/34* | (2006.01) |

(52) U.S. Cl.
CPC .............. *B01D 3/003* (2013.01); *B01D 3/02* (2013.01); *B01D 3/42* (2013.01); *H05B 1/0244* (2013.01); *H05B 3/34* (2013.01); *H05B 2203/021* (2013.01)

(58) Field of Classification Search
CPC ........ B01D 1/0017; B01D 3/003; B01D 3/02; B01D 3/42; H05B 1/0244; H05B 3/34
See application file for complete search history.

(56) References Cited

U.S. PATENT DOCUMENTS

| | | | | |
|---|---|---|---|---|
| 2,054,594 A | * | 9/1936 | Borden .................... | A45D 4/06 219/226 |
| 2,266,210 A | * | 12/1941 | Osterheld ........ | G05D 23/27541 219/492 |
| 2,387,177 A | * | 10/1945 | Osterheld ............. | F24H 9/2021 392/459 |
| 2,456,144 A | * | 12/1948 | Osterheld ............. | F24H 9/1818 219/526 |
| 3,274,076 A | * | 9/1966 | Watt ........................ | B01D 3/12 159/6.2 |
| 3,430,032 A | * | 2/1969 | Morey ..................... | B01L 7/00 219/415 |
| 4,053,006 A | * | 10/1977 | Tkac ...................... | B01D 1/225 159/6.2 |
| 4,269,663 A | * | 5/1981 | McFee .................... | B01D 3/02 202/185.3 |
| 4,798,939 A | * | 1/1989 | Nett ..................... | A47J 27/0817 219/415 |
| 4,947,983 A | * | 8/1990 | Jost ...................... | B01D 1/0017 122/18.1 |
| 5,582,680 A | * | 12/1996 | Vankouwenberg ..... | C02F 1/048 110/235 |

(Continued)

*Primary Examiner* — Jonathan Miller
(74) *Attorney, Agent, or Firm* — Quarles & Brady LLP (57) ABSTRACT

An electrically heated still is provided. The still includes a still pot that is filled with fermented mash to be distilled. The still pot is heated by a heating element assembly that wraps around the outer surface of the side wall of the still pot (e.g., around the circumference of the mid-section of the still pot). The heating element assembly contains one or more heating elements. The heating elements include flexible conductive elements (e.g., "rope" heaters) that conform to the shape of the still pot to efficiently transfer heat thereto.

18 Claims, 4 Drawing Sheets

(56) References Cited

U.S. PATENT DOCUMENTS

| | | | | |
|---|---|---|---|---|
| 6,283,014 B1* | 9/2001 | Ng | ............... | A47J 27/0802 |
| | | | | 219/431 |
| 6,548,789 B1* | 4/2003 | Rock | ............... | D04B 1/04 |
| | | | | 219/211 |
| 6,887,344 B1* | 5/2005 | VanKouwenberg | ............... | |
| | | | | B01D 1/0017 |
| | | | | 159/23 |
| 7,012,221 B2* | 3/2006 | Li | ............... | A47J 27/004 |
| | | | | 219/386 |
| 2008/0245786 A1* | 10/2008 | Sharma | ............... | H05B 3/347 |
| | | | | 219/529 |
| 2013/0277358 A1* | 10/2013 | Lollar | ............... | H05B 1/00 |
| | | | | 219/536 |
| 2015/0031142 A1* | 1/2015 | Zhang | ............... | G01N 25/4826 |
| | | | | 436/147 |
| 2017/0106310 A1* | 4/2017 | Astoria | ............... | B01D 1/08 |

* cited by examiner

ELECTRIC STILL WITH EXTERNAL HEATING ELEMENT

CROSS-REFERENCE TO RELATED APPLICATIONS

This application claims the benefit of U.S. Provisional Patent Application Ser. No. 62/284,560, filed on Oct. 5, 2015, and entitled "Electric Still with External Heating Element."

BACKGROUND OF THE DISCLOSURE

Grain-based spirits can be distilled either after removing the grain solids, or with the grain solids remaining in the "mash," which is called "grain-in" distilling. Grain-in batch distilling has several advantages, including more efficient conversion of the grain to alcohol and, in the case of some spirits, a better tasting product.

Batch stills are available that employ one of four types of heating systems: direct flame heating; immersion electric heating elements; liquid-jacketed heating and steam-jacketed heating. Direct flame and immersion electric heating element stills are not practical for grain-in distilling. Their localized, high-temperature heating surfaces scorch the mash when operated at higher levels. As a result, the heat settings in these stills must be turned down to such an extent during a grain-in batch run that the distillation time becomes impractically long.

Liquid-jacketed stills circulate an externally heated liquid through a cavity formed by a double-wall of the still. They are capable of grain-in distilling without scorching because the heat is distributed over a large surface area with the result that no hot spots are produced. However, liquid jacketed stills are very slow to reach distilling temperatures, and they are very slow to respond when the operator changes the heat settings.

Steam-jacketed stills employ an external steam boiler and the steam is pumped through pipes to a cavity formed by a pressure-tested double wall of the still. These stills are the mainstay of the commercial distilling industry. They heat quickly, are responsive to changes in heat settings, and can in a timely manner distill grain-in without scorching . However, the pressure-tested double-wall still and the steam boiler system required to power it, are very expensive.

SUMMARY OF THE DISCLOSURE

The present disclosure describes an electric still having a still pot that is heated by an electric heating element assembly that wraps around the outer surface of the still pot to provide substantially uniform heat over a surface area sufficient to produce efficient heating of the mash without producing localized high temperatures that might burn the product.

A general aspect of the present disclosure is to provide an electric still that will efficiently heat the mash without burning it. This is achieved in part by employing a heating element assembly that contains one or more heating elements that is attached to the still pot such that the heating element assembly distributes its generated heat substantially uniformly over a large area of the still pot outer surface. The heating elements used in the heating element assembly can be flexible conductive elements that are characterized by the watts of heating power produced per unit length. By judiciously selecting this wattage as well as the spacing between adjacent heating elements on the outer surface of the still pot, the heating per unit area of still pot surface can be selected to prevent mash burning.

Another aspect of the present disclosure is to produce maximum heating in an electric still without damaging the resulting distillate. In addition to distributing the still pot heating over the outer surface of the still pot, the electric power can be precisely controlled as a function of the particular distillation being performed. For example, if burning the mash is not an issue, electric power can be increased to speed the distillation process, whereas the power may be turned down an appropriate amount to reduce the heating per unit area when burning might be an issue.

Yet another aspect of the present disclosure is the ability to adjust the heating surface area to accommodate different batch sizes. The heating element assembly may be divided into separately controllable segments each containing one or more heating elements that are disposed over different locations on the still pot surface. For example, when a smaller batch is being distilled, heating elements located above the level of the mash may be turned off to conserve energy.

These and other objects and advantages of the present disclosure will become apparent from the following description and reference is made to the claims herein to define the scope of the invention.

DETAILED DESCRIPTION

Figure 1:
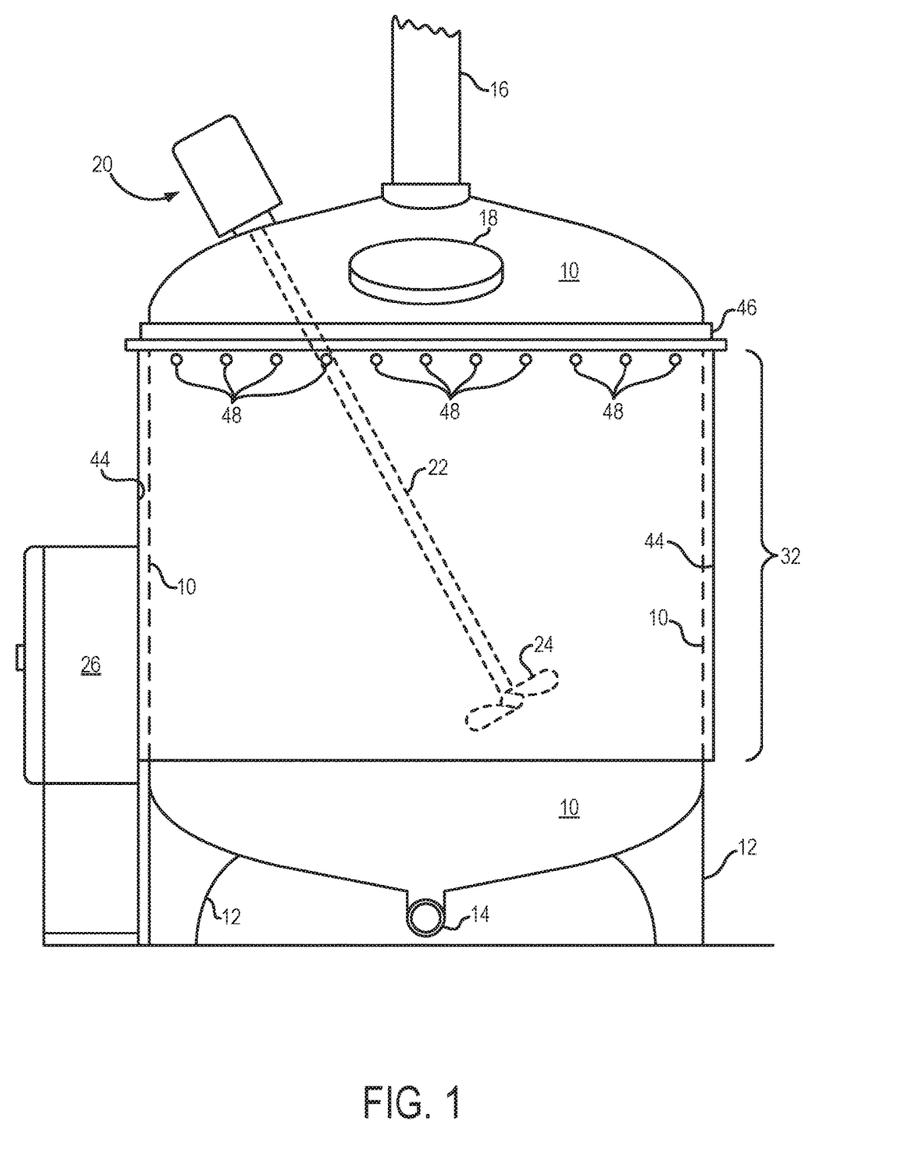
FIG. 1 is an elevation view of one example of an electric still described in the present disclosure.

The present disclosure describes an electrically heated still, which includes a still pot 10 that is filled with fermented mash to be distilled. The still pot 10 is preferably a single-wall still pot. As shown in FIG. 1, in a preferred embodiment, the still pot 10 is a circular cylindrical copper container having a 300 gallon capacity; however, in other embodiments the still pot 10 can have shapes other than a circular cylindrical shape, can have capacities different from 300 gallons, and can be composed of other suitable heat conducting materials commonly employed in stills, such as stainless steel, depending on the intended use of the still pot 10. The still pot 10 is supported above the floor by legs 12 (e.g., four legs) that extend downward from its lower end, and the lower end of the still pot 10 is shaped to allow easy drainage of its contents through a drain 14. The top end of the still pot 10 is dome-shaped and supports an upward extending distillation column 16 at its center. In other embodiments, the top end of the still pot 10 can have shapes other than being dome-shaped, such as having a conical-shaped top or a flat top.

As is well known in the art, the distillation column 16 can take many forms depending on the type and quality of the spirits being produced. The top end of the still pot 10 also has a cleanout opening with sealing cover 18 and the top end of the still pot 10 also provides support for an agitator 20. The agitator 20 has a shaft 22 that extends downward at an angle into the still pot 10 and is terminated with an impeller 24. When the agitator 20 is energized, as described in more detail below, the shaft 22 rotates and the impeller 24 circulates the contents of the still pot 10 to maintain a uniform temperature throughout the mash during distillation.

Referring still to FIG. 1, an electrical enclosure 26 is mounted adjacent the still pot 10 to provide termination for electric heating elements described below and to receive power from a controller also described in detail below. The enclosure is selected to meet applicable codes.

The still pot 10 can be constructed using a number of different metals commonly employed in stills. However, in a preferred embodiment, the circular cylindrical mid-section 32 of the still pot 10 is formed from copper because of its high thermal conductivity. As will now be described, an electric heating element assembly containing one or more heating elements wraps around the outer surface of the side wall (i.e., mid-section 32) of the still pot 10. Because of its high thermal conductivity, copper disperses the heat to the contents being distilled more efficiently and more uniformly than other materials with lower thermal conductivities.

Figure 2:
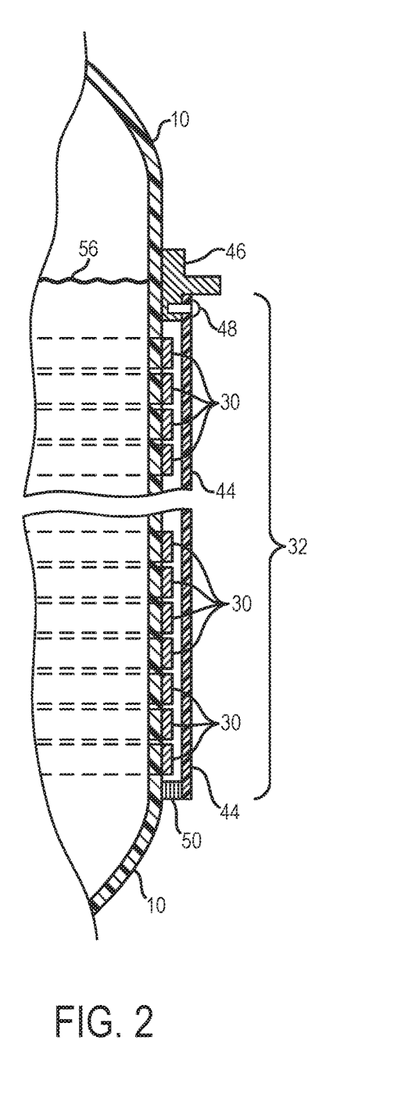
FIG. 2 is a partial elevation view of the still of FIG. 1 with parts cut away.

Referring now to FIGS. 1 and 2, the still pot 10 is heated by a heating element assembly 29 that wraps around the circumference of the mid-section 32 of the still pot 10. The heating element assembly 29 contains one or more heating elements 30 that each include a flexible conductive element that conforms to the shape of the still pot 10 to efficiently transfer heat thereto. In some examples, such as those described below, the heating elements 30 include flexible "rope" heaters.

In some embodiments, the heating element assembly 29 contains a single heating element 30 that wraps around the circumference of the mid-section 32 of the still pot 10. For instance, the heating element 30 can wrap around the circumference of the mid-section 32 such that each turn of the heating element 30 is at a different height of the mid-section 32. It will be appreciated, however, that other patterns of wrapping the heating element 30 around the circumference of the mid-section 32 can also be implemented to provide uniformly distributed heating over a large area of the outer surface of the still pot 10. In other embodiments, the heating element assembly 29 contains more than one heating element 30. In some examples, each heating element 30 is connected to a separate branch circuit, such that each heating element 30 can be separately energized as desired. In other examples, multiple heating elements 30 can be connected to the same branch circuit, so as to form segments of heating elements 30 such that each segment can be separately energized as desired. In either case, the heating elements 30 can wrap around the circumference of the still pot mid-section 32 once or multiple times.

Having closely spaced successive wraps of the heating elements 30 in the heating element assembly 29 around the still pot 10 provides a uniformly distributed amount of heat over a large area of the outer surface of the still pot 10. This enables a large amount of heat to be applied without producing hot spots that might burn the mash being distilled. Moreover, the heating power produced per unit length of the heating elements 30 can be selected and otherwise controlled as described below to prevent burning of the mash.

Figure 3:
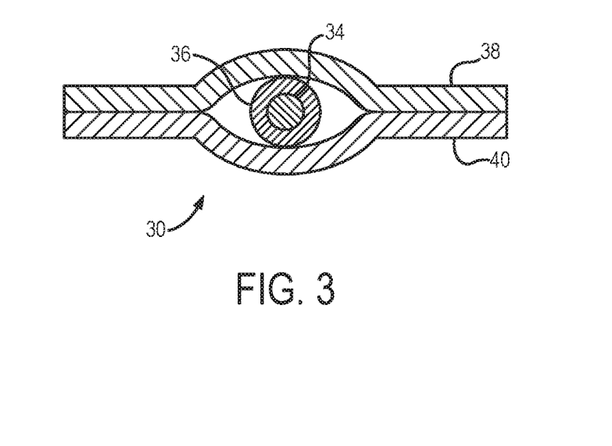
FIG. 3 is a cross sectional view of a heating element which forms part of the still of FIGS. 1 and 2.

Referring particularly to FIG. 3, in one example construction, the heating elements 30 are commercially available from Jen-Ter Wire & Element of Fox Lake, Wis. They are fabricated according to UL-499 standards for electric heating appliances. The heating elements 30 are formed by wrapping a resistance wire 34 around a core material (e.g., a fiberglass core) and then surrounding it with a sleeve 36 of high temperature electrical insulating material, which may be braided fiberglass yarn. The insulated resistance wire 34 is then laminated between two sheets 38 and 40 of conductive foil (e.g., aluminum foil) coated with an adhesive that retains adhesion at or above normal operating temperatures of the still (e.g., a silicon adhesive that is good to 600 degrees F.). The adhesive on one foil 38 retains the heating element 30 components together as shown and the adhesive on the other foil 40 retains the resulting heating element 30 to the surface of the still pot 10.

The heating elements 30 used in a preferred embodiment have a width of one inch and successive wraps are positioned contiguously along the height of the still pot 10. As a result, the rope heating elements on successive wraps around the still pot 10 are spaced apart approximately one inch. In other embodiments, the heating elements 30 can have widths other than one inch. It will be appreciated that selection of the length and width of the heating elements 30 will affect the heating capacity of the heating elements 30, and thus the selection of the length and width of the heating elements 30 may be influenced by the available electrical service. Likewise, in other embodiments, the heating elements 30 can be spaced apart by more or less than one inch, for example, depending on the desired uniformity in distributing heat on the outer surface of the still pot 10.

Referring again to FIGS. 1 and 2, it is important to keep the heating elements 30 dry, and some electric codes may require that the heating elements 30 also be electrically shielded. Both of these objectives can be met by wrapping a metal shield 44 around the entire mid-section 32 of the still pot 10 to enclose the heating element assembly 29. The shield 44 may be made of sheet aluminum or stainless steel that is flexible enough to bend around the circumference of the still pot 10.

The shield 44 is retained on the still pot 10 by a mounting ring 46. The mounting ring 46 extends around the still pot 10 and it fastens to the still pot 10 at the top end of the mid-section 32 of the still pot 10. Threaded openings are formed on a flange that extends downward from the mounting ring 46 and these threaded openings are evenly spaced and aligned with openings along the top edge of the shield 44. Fastener screws 48 attach the shield 44 to the mounting ring 46 using these openings. The lower edge of the shield 44 is sealed with the outer surface of the still pot 10 by a gasket 50. The gasket 50 extends completely around the still pot 10 and can be made of closed cell foam rubber or other suitable material. A silicone adhesive, or other suitable adhesive, fastens the gasket 50 to the lower edge of the shield 44. During assembly, the shield 44 is drawn tightly around the still pot 10 to compress the gasket 50 and to thereby ensure a moisture-resistant seal.

As indicated above, a teaching of the present disclosure is to cover the outer surface of the still pot 10 with a heating element assembly 29 that provides a uniform pattern of heating elements 30. In a preferred embodiment, this takes the form of a series of wraps around the circumference of the still pot 10. Successive wraps extend from the lower end to the upper end of the mid-section 32 of the still pot 10. Another teaching of the present disclosure is that the heating element assembly 29 can be divided into a plurality of segments, and as described above, each segment of heating elements 30 can include one or more heating elements 30. There are a number of advantages in doing this. Referring to FIG. 2, when a full batch of mash is being distilled as indicated by the fluid level 56, best performance is achieved by energizing the entire heating element assembly 29. However, if a smaller batch is being distilled and the fluid level is lower in the still pot 10, it is more efficient to de-energize the top portion of the heating element assembly 29 that is above this lower fluid level.

Another reason for dividing the heating element assembly 29 into separate segments is to accommodate the capacity of available electrical service. For example, electrical service may be available in 20-amp, 30-amp, or 50-amp branch circuits. The heating element assembly 29 can be divided into segments that each use an available branch circuit up to its rated capacity.

It can also be more convenient on larger stills to divide the heating element assembly 29 into single-wrap sections. In this configuration, each heating element 30 is sized in length to wrap around the still pot 10 once, and the ends of each heating element 30 are terminated in the electrical enclosure 26. It can be easier to handle shorter heating elements 30, and this approach facilitates assembly. In addition, using heating elements 30 that wrap around the circumference of the still pot 10 once allows greater flexibility in combining heating elements 30 into separately controllable segments.

Figure 4:
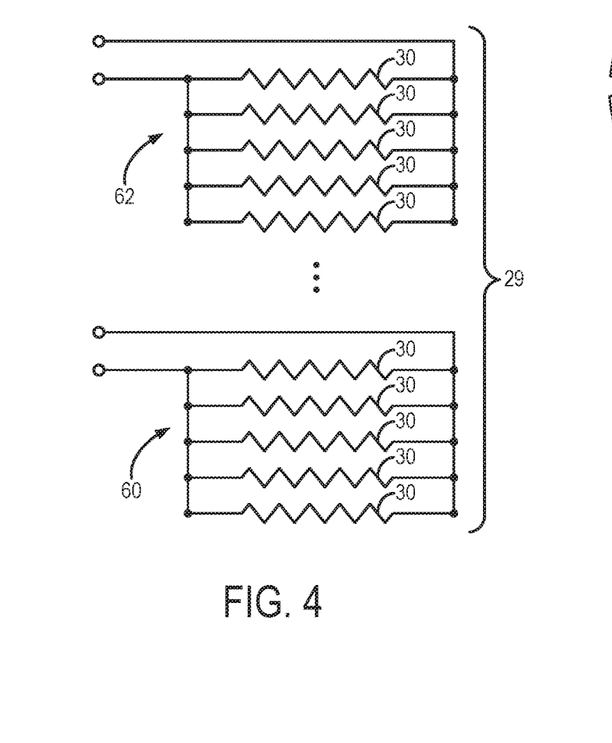
FIG. 4 is an electrical schematic drawing of heating element segments each containing multiple ones of the heating element of FIG. 3.

Referring particularly to FIG. 4, in one embodiment the still pot 10 has a diameter of four feet. A single-wrap heating element 30 section has a length of 151 inches and a 1217 watt heating capacity. This results in a heating capacity of substantially 8 watts per inch of heating element 30. This, along with the one inch spacing between heating elements 30, has been found to provide a substantially uniform heating over the outer surface of the still pot 10 and to safely limit the temperature produced at any location on the still pot 10 surface. To accommodate 30-amp circuit branches, five of these 1217 watt heating elements 30 are connected in parallel to form a heating element segment. A first such heating element segment 60 covers the lower end of the mid-section 32 of the still pot 10 and a second such heating element segment 62 covers the top end of the mid-section 32 of the still pot 10. Four additional heating element segments (not shown in the drawings) are disposed between the first heating element segment 60 and the second heating element segment 62.

Figure 5:
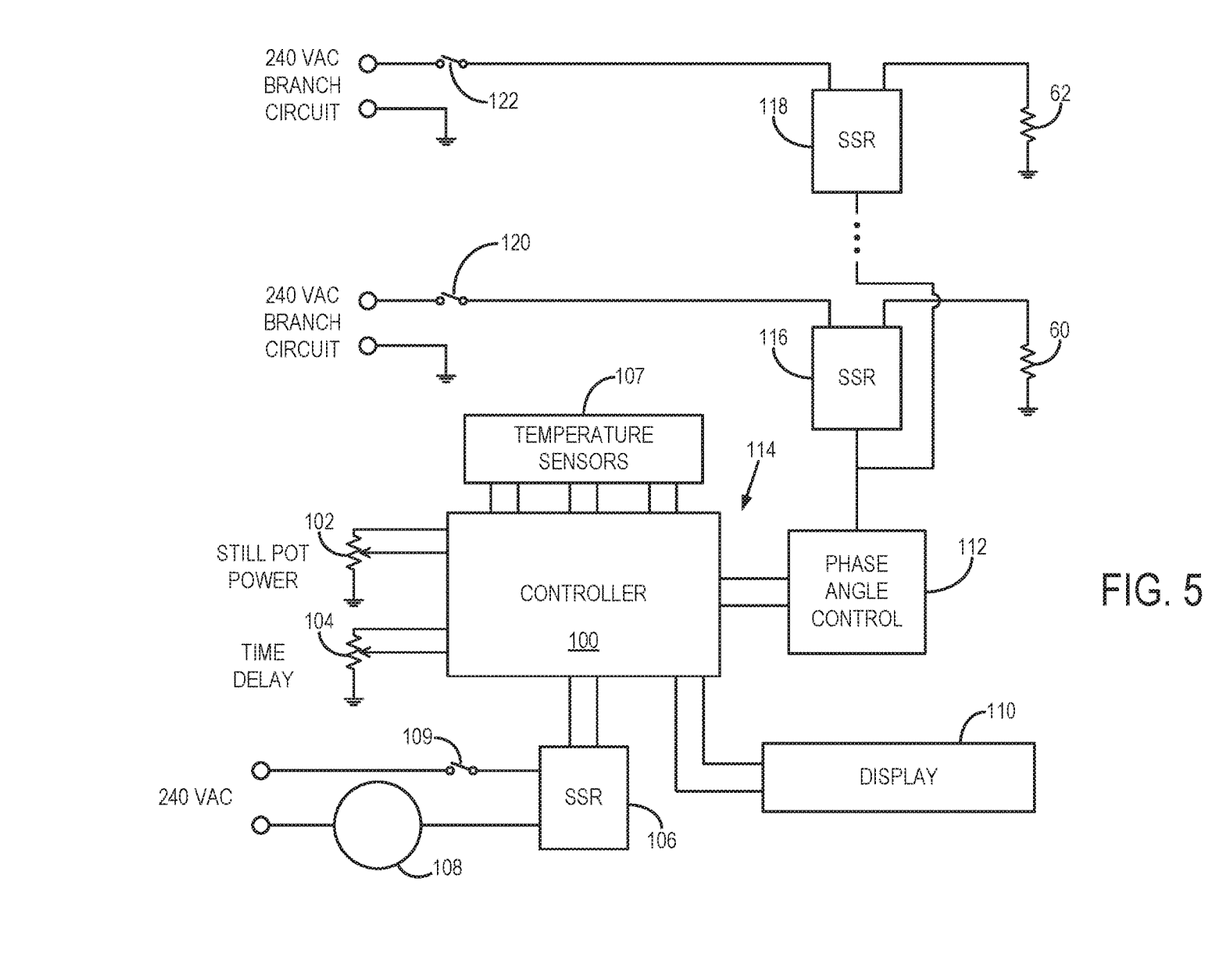
FIG. 5 is an electrical block diagram of the controller that operates the still of FIG. 1.

Referring particularly to FIG. 5, the controller 100 for operating the heating elements 30 and performing other still functions can be formed around a commercially available microcomputer, such as the Omega 2560 from Arduino LLC, but can also be any suitable controller having programmable instructions stored thereon for operating the heating elements 30 and performing other still functions. In this example, the controller 100 has two analog inputs that connect to a first potentiometer 102 and a second potentiometer 104 for manually entering commands that control the electric power applied to the heating elements 30 and to set a time delay for the application of that power, respectively. As an example, the power command can range from 0% to 100% of full power and the time delay setting can range from 1 to 12 hours. As will be described in more detail below, the time delay command starts a timer that is counted down over the set time to delay before the heating power is applied. This allows, for example, the still to be set to turn on heating power during the night so that it is up to near distillation temperature at the start of the work day.

The controller 100 also has a digital output connected to the control terminals of a solid-state relay ("SSR") 106. The SSR 106 is operated in a simple on/off mode and it controls the AC power applied to the still's agitator motor 108.

Temperature sensors 107 can be used to monitor the still pot temperature, still head temperature, condenser temperature, and so on. As one example, three temperature sensors 107 connect to three 1-bit digital inputs on the microcomputer 100. One temperature sensor 107 measures still pot temperature, a second temperature sensor 107 measures still head temperature, and the third temperature sensor 107 measures condenser temperature. Many different temperature sensor devices can be used, such as DS18B20 digital temperature sensors commercially available from Maxim Integrated Products, Inc., which serially communicate with the controller 100 using Maxim's 1-wire bus protocol.

A display 110 connects to the controller 100 (e.g., via a serial or other port) to display the still's operating conditions. The display data is output serially using the I2C (Inter-Integrated Circuit) protocol, although many other well-known methods can be used. In one example, the display 110 includes five 4-digit, seven-segment LED devices that use the I2C protocol, such as those commercially available from Adafruit Industries, LLC. This enables commanded still pot power, any commanded time delay, and the three still temperatures to be displayed on the controller front panel (not shown in the drawings) for operator viewing.

The commanded heating power is output by the controller 100 to a phase angle control 112 through a single-bit digital output 114. This digital output is pulse-width modulated ("pwm") to effectively provide a 0% to 100% output command to the input of the phase angle control 112. The phase angle control 112 is a commercially available device sold as the SSRMAN-1P by NuWave Technologies, Inc.; however, it will be appreciated that other suitable phase angle controls can also be used. The phase angle control 112 provides true linear phase angle control of an AC powered load. The 0% to 100% power command output from the controller 100 thus applies a corresponding 0% to 100% heating power to the still pot 10.

The phase angle control 112 is connected to operate one or more solid-state relays ("SSRs"). In the example shown in FIG. 5, two SSRs 116 and 118 are shown, and these SSRs 116 and 118 connect to the respective heating element segments 60 and 62 described above. Four additional SSRs (not shown in the drawings) are employed in a preferred embodiment and are connected in the same manner to other segments of heating elements 30. As one example, the SSRs 116 and 118 are 50-amp random turn-on switches, such as the D2450-10 product commercially available from Crydom, Inc.; however, it will be appreciated that other suitable SSRs can also be used. The SSR 116 connects to receive power from one 30-amp 240 volt AC branch circuit through a first disconnect switch 120, and the SSR 118 connects to receive power from a second 30-amp branch circuit through a second disconnect switch 122. The SSRs 116 and 118 control the phase at which the 240 VAC power is applied to the still heating elements 30 during each 60-cycle per second cycle to provide heating power that is proportional to the heating power command. The disconnect switches 120 and 122 enable either of the heating element segments 60 or 62 to be disabled during a batch run. This control is useful when a smaller batch is being distilled and less heating is required. It also enables heating elements 30 located above the mash level to be turned off to avoid the possibility of its overheating.

Many variations are possible from the configurations of the electric still described above. For example, a programmable logic controller ("PLC") may be used for the controller 100 in place of the microcomputer described above, and a touch screen control panel can serve as both the display 110 and the command input devices rather than the first and second potentiometers 102 and 104. Also, the circuitry for controlling the heating elements 30 will differ depending on the still size and the number of heating elements 30 used, and if segments of heating elements 30 are used, will differ depending on the number of heating elements 30 arranged in each segment and the total number of heating element segments used. In the configuration described above, an additional phase-controlled SSR is will be used for each added heating element segment, and the size of each heating element segment is determined by the maximum wattage of each heating element segment. The additional branch circuits and their disconnect switches are similarly sized.

Figure 6:
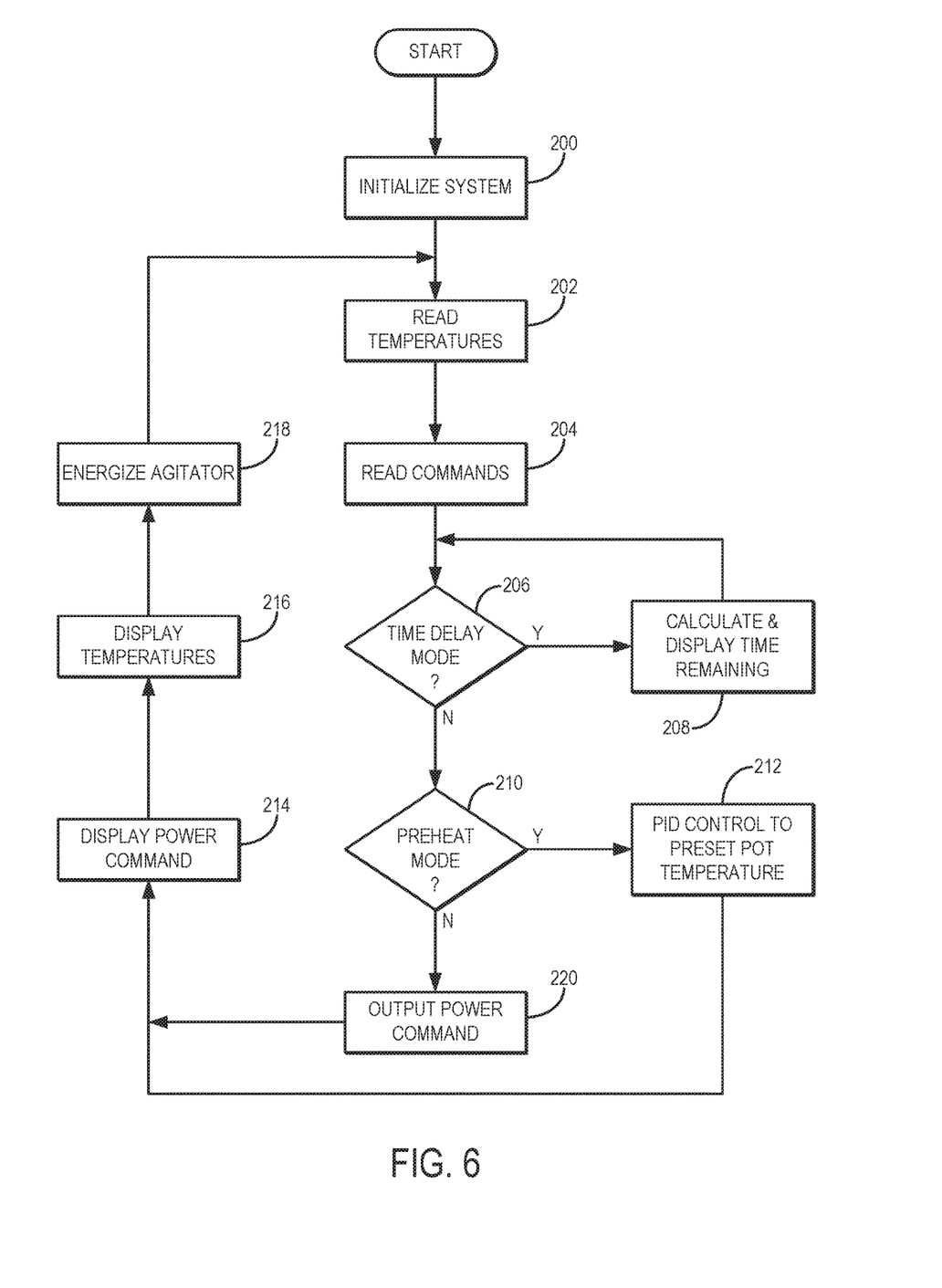
FIG. 6 is a flow chart of the software executed by the controller of FIG. 5.

Referring particularly to FIG. 6, the controller 100 is programmed to direct the above hardware to carry out the still functions. After initializing the system as indicated at process block 200, the three still temperatures are input from sensors 107 as indicated at process block 202. As indicated above, in one example this employs the 1-wire serial communications protocol used with the temperature sensors 107. Next, as indicated at process block 204, the still pot power command and the time delay command are input from the first and second potentiometers 102 and 104, or other input devices.

If a time delay has been entered through the second potentiometer 104 as determined at decision block 206, a loop is entered in which the remaining delay time is calculated and displayed as indicated at process block 208. This delay mode is maintained until the calculated remaining delay time reaches zero The system then enters the preheat mode as indicated at decision block 210. In preheat mode the controller calculates and outputs a still power command using a PID calculation at process block 212. As is well known in the art, a PID control loop uses the measured pot temperature to calculate a still power command that will quickly and smoothly bring the pot temperature up to a preset level. In some embodiments, this preset is set to 150 degrees F. During the preheat mode the command produced by the first potentiometer 102 is ignored as the power command is being calculated by the PID loop.

Referring still to FIG. 6, after the calculated power command is determined during the preheat mode, it is output to the phase angle control 112 at process block 212. The power command is also output to display 110 at process block 214. The sensed still temperatures are then displayed at process block 216. Since heat is now being applied to the still pot contents, the agitator motor 108 may be energized next as indicated at process block 218. The agitator motor 108 is energized when the average recent power command is greater than a preset percentage of full power. Also, as shown in FIG. 5, the agitator motor 108 may be manually disconnected by a switch 109. This might be done, for example, when there is no grain in the batch being processed, and thus no risk of imparting off taste to the distillate.

When preheat is done and the preheat mode is exited as indicated at decision block 210, the power command that is manually set by the first potentiometer 102 is output to the phase angle control 112, as indicated at process block 220. The system then loops back through process blocks 214, 216, and 218 to update the displayed values as described above. For the duration of the distillation process the controller responds to changes in the still pot power command manually entered through the first potentiometer 102 to control the still heating elements 30 and the display 110 is updated.

It should be apparent to those skilled in the art that the controller can also be used to monitor and display head temperature and parrot temperature and control servo valves that in turn control the amount of dephlegmator water and condenser water used during the distillation process.

The present disclosure has described one or more preferred embodiments, and it should be appreciated that many equivalents, alternatives, variations, and modifications, aside from those expressly stated, are possible and within the scope of the invention.

The invention claimed is:

1. An electric still, the combination comprising:
a still pot made of a heat conducting material and having a side wall that defines a cavity for receiving mash that is to be distilled;
a heating element assembly for heating the mash to a distillation temperature comprising at least one heating element disposed on an outer surface of the side wall in close thermal proximity to the mash contained in the still pot, the heating element assembly being fastened to the outer surface of the side wall and in thermal contact therewith, wherein the heating element assembly is disposed over a substantial area of the side wall such that heat conveyed by the heating element assembly for heating the mash to the distillation temperature is distributed over the substantial surface area of the side wall; and
an electric controller connected to the heating element assembly and connected to a source of electric power, the electric controller being operable to control an electric power applied to the heating element assembly and to thereby control an amount of heat produced by the heating element assembly over the outer surface of the side wall.

2. The electric still as recited in claim 1 in which the heating element assembly comprises a plurality of heating elements and the heating element assembly is divided into segments each containing at least one heating element and the electric controller is operable to separately control the amount of heat produced by each segment.

3. The electric still as recited in claim 2 in which each segment contains only one heating element.

4. The electric still as recited in claim 2 in which each segment contains a same number of multiple heating elements.

5. The electric still as recited in claim 2 in which each segment is formed by wrapping the at least one heating element in that segment around the still pot a plurality of times and each such segment is located at a different height.

6. The electric still as recited in claim 5 in which a spacing between successive wraps of the at least one heating element in each segment is selected to provide a substantially uniform heating over an area of the outer surface of the still pot over which the segment is disposed.

7. The electric still as recited in claim 1 in which the heating element assembly extends over the outer surface of the still pot side wall and a heating power produced per unit length of heating element is selected to prevent burning of the mash.

8. The electric still as recited in claim 1 in which the at least one heating element wraps around the still pot a plurality of times and a spacing between successive wraps is selected to provide substantially uniform heating over an area of the outer surface of the still pot against which it is disposed.

9. The electric still as recited in claim 1 in which the heating element assembly comprises a plurality of heating elements that each wrap around a circumference of the outer surface one time and wherein the heating element assembly is divided into a plurality of segments each containing at least two of the plurality of heating elements connected in parallel such that each segment is separately controllable by the electric controller.

10. The electric still as recited in claim 9 in which a number of heating elements in each segment is selected to consume a selected wattage from an electrical service branch circuit.

11. The electric still as recited in claim 1 which further includes a shield disposed over the heating element assembly to protect the heating element assembly from moisture.

12. The electric still as recited in claim 11 in which the shield is made from an electrically conductive material that electrically shields the heating element assembly.

13. The electric still as recited in claim 1 in which the electric controller is manually operable to control the electric power applied to the heating element assembly by switching on the applied electric power periodically as a function of applied power phase angle.

14. The electric still as recited in claim 1 in which the electric controller includes a timer, which enables the electric power to be applied to the heating assembly at a preset time.

15. The electric still as recited in claim 1 in which the still includes an agitator that circulates the mash when energized, and the electric controller is operable to energize the agitator when electric power is applied to the heating element assembly.

16. The electric still as recited in claim 1 in which the at least one heating element is a flexible heating element.

17. The electric still as recited in claim 16 in which the flexible heating element includes a rope heater comprising a flexible core material, a resistance wire wrapped around the flexible core material, and a flexible insulator wrapped around the resistance wire.

18. The electric still as recited in claim 1 in which the at least one heating element is disposed on the outer surface of the still pot side wall so as to spread heat produced by the at least one heating element substantially evenly over a surface area covered by the at least one heating element.

* * * * *

UNITED STATES PATENT AND TRADEMARK OFFICE
CERTIFICATE OF CORRECTION

PATENT NO. : 10,350,509 B2
APPLICATION NO. : 15/285006
DATED : July 16, 2019
INVENTOR(S) : Brian Sammons

Page 1 of 1

It is certified that error appears in the above-identified patent and that said Letters Patent is hereby corrected as shown below:

In the Specification

Column 6, Line 9, "DS18820" should be --DS18B20--.

Signed and Sealed this
Twenty-fourth Day of September, 2019

Andrei Iancu
*Director of the United States Patent and Trademark Office*